(12) United States Patent
Vujcic

(10) Patent No.: US 8,897,241 B2
(45) Date of Patent: Nov. 25, 2014

(54) RADIO RESOURCE ALLOCATION

(75) Inventor: Dragan Vujcic, Paris (FR)

(73) Assignee: LG Electronics Inc., Seoul (KR)

( * ) Notice: Subject to any disclaimer, the term of this patent is extended or adjusted under 35 U.S.C. 154(b) by 214 days.

(21) Appl. No.: 13/391,809

(22) PCT Filed: Oct. 14, 2010

(86) PCT No.: PCT/KR2010/007047
§ 371 (c)(1),
(2), (4) Date: Jun. 6, 2012

(87) PCT Pub. No.: WO2011/046377
PCT Pub. Date: Apr. 21, 2011

(65) Prior Publication Data
US 2012/0236803 A1    Sep. 20, 2012

Related U.S. Application Data

(60) Provisional application No. 61/251,703, filed on Oct. 14, 2009.

(51) Int. Cl.
*H04W 4/00* (2009.01)
*H04L 5/00* (2006.01)
*H04W 72/04* (2009.01)

(52) U.S. Cl.
CPC .............. *H04L 5/003* (2013.01); *H04W 72/048* (2013.01)
USPC ......................................................... 370/329

(58) Field of Classification Search
CPC ...................................................... H04W 72/04
USPC ................... 370/216–241, 328–339; 375/295
See application file for complete search history.

(56) References Cited

U.S. PATENT DOCUMENTS

| | | | |
|---|---|---|---|
| 2007/0291719 A1 | 12/2007 | Demirhan et al. | |
| 2009/0052391 A1 | 2/2009 | Park et al. | |
| 2009/0201873 A1 | 8/2009 | Korhonen et al. | |
| 2010/0226320 A1* | 9/2010 | Asanuma | 370/329 |
| 2011/0141878 A1* | 6/2011 | Che et al. | 370/216 |
| 2011/0206157 A1* | 8/2011 | Xu et al. | 375/295 |

* cited by examiner

*Primary Examiner* — Ricky Ngo
*Assistant Examiner* — Iqbal Zaidi
(74) *Attorney, Agent, or Firm* — Mckenna Long & Aldridge LLP

(57) ABSTRACT

A method of and apparatus for allocating radio resources to a UE according to the capability of the UE, wherein the radio resources to be allocated include a set of radio resources which are incompatible with a first type of UE and are compatible with at least a second type of UE, the method comprising: receiving a random access preamble from a UE; transmitting a first random access response assigning a first set of radio resources compatible with the first type of UE, and a second random access response assigning a second set of radio resources incompatible with the first type of UE; wherein the first random access response is scheduled differently in time and/or frequency to the second access response; receiving a connection request message from the UE; wherein, if the connection request message is received on the first set of radio resources it is determined that the UE is a UE of the first type; and wherein if the connection request message is received on the second set of radio resources, it is determined that the UE is not of the first type.

20 Claims, 6 Drawing Sheets

RADIO RESOURCE ALLOCATION

This application is a 35 U.S.C. §371 National Stage entry of International
Application No. PCT/KR2010/007047, filed on Oct. 14, 2010, and claims the benefit of U.S. Provisional Application No. 61/251,703, filed on Oct. 14, 2009, both of which are incorporated by reference in their entirety herein.

TECHNICAL FIELD

The present invention relates to the allocation of radio resources in a cellular communications network, and in particular to a method and apparatus for allocating radio resources or indicating UE capability. While it is described below in the context of a long term evolution (LTE) and LTE-A (long term evolution advanced) type cellular network for illustrative purposes and since it happens to be well suited to that context, those skilled in the art will recognise that the invention disclosed herein can also be applied to various other types of cellular networks.

BACKGROUND ART

A universal mobile telecommunications system (UMTS) is a 3rd Generation (3G) asynchronous mobile communication system operating in Wideband Code Division Multiple Access (WCDMA) based on a European standard known as Global System for Mobile Communications (GSM), and general packet radio services (GPRS). The LTE of UMTS is under discussion by the 3rd generation partnership project (3GPP) that standardised UMTS.

3GPP LTE is a technology for enabling high-speed packet communications. Many schemes have been proposed for the LTE objective including those that aim to reduce user and provider costs, improve service quality, and expand and improve coverage and system capacity. 3G LTE requires reduced cost per bit, increased service availability, flexible use of a frequency band, a simple structure, an open interface, and adequate power consumption of a terminal as an upper-level requirement.

FIG. 1 is a block diagram illustrating a network structure of an evolved universal terrestrial radio access system (E-UTRA). The E-UTRA may be also referred to as an LTE system. The communication network is widely deployed to provide a variety of communication services such as voice and packet data.

As illustrated in FIG. 1, the E-UTRA network includes an evolved UMTS terrestrial radio access network (E-UTRAN) and an evolved packet core (EPC) and one or more user equipments (UEs) 101. The E-UTRAN may include one or more evolved NodeBs (eNodeB, or eNB) 103, and a plurality of UEs 101 may be located in one cell. One or more E-UTRAN mobility management entity (MME)/system architecture evolution (SAE) gateways 105 may be positioned at the end of the network and connected to an external network.

As used herein, "downlink" refers to communication from an eNodeB 103 to a UE 101, and "uplink" refers to communication from the UE 101 to an eNodeB 103. UE 101 refers to communication equipment carried by a user and may be also be referred to as a mobile station (MS), a user terminal (UT), a subscriber station (SS), terminal or a wireless device.

An eNodeB 103 provides end points of a user plane and a control plane to the UE 101. MME/SAE gateway 105 provides an end point of a session and mobility management function for UE 101. The eNodeB 103 and the MME/SAE gateway 105 may be connected via an Si interface.

The eNodeB 103 is generally a fixed station that communicates with a UE 101, and may also be referred to as a base station (BS), a network entity or an access point. One eNodeB 103 may be deployed per cell. An interface for transmitting user traffic or control traffic may be used between eNodeBs 103.

The MME provides various functions including distribution of paging messages to eNodeBs 103, security control, idle state mobility control, SAE bearer control, and ciphering and integrity protection of non-access stratum (NAS) signaling. The SAE gateway host provides assorted functions including termination of U-plane packets for paging reasons, and switching of the U plane to support UE mobility. For clarity, MME/SAE gateway 105 will be referred to herein simply as a "gateway," but it is understood that this entity includes both an MME and an SAE gateway.

A plurality of nodes may be connected between the eNodeB 103 and the gateway 105 via the S1 interface. The eNodeBs 103 may be connected to each other via an X2 interface and neighbouring eNodeBs may have a meshed network structure that has the X2 interface.

FIG. 2(a) is a block diagram depicting architecture of a typical E-UTRAN and a typical EPC. As illustrated, eNodeB 103 may perform functions of selection for gateway 105, routing toward the gateway during a radio resource control (RRC) activation, scheduling and transmitting of paging messages, scheduling and transmitting of broadcast channel (BCCH) information, dynamic allocation of resources to UEs 101 in both uplink and downlink, configuration and provisioning of eNodeB measurements, radio bearer control, radio admission control (RAC), and connection mobility control in LTE_ACTIVE state. In the EPC, and as noted above, gateway 105 may perform functions of paging origination, LTE-IDLE state management, ciphering of the user plane, system architecture evolution (SAE) bearer control, and ciphering and integrity protection of non-access stratum (NAS) signaling.

FIGS. 2(b) and 2(c) are block diagrams depicting the user-plane protocol and the control-plane protocol stack for the E-UMTS. As illustrated, the protocol layers may be divided into a first layer (L1), a second layer (L2) and a third layer (L3) based upon the three lower layers of an open system interconnection (OSI) standard model that is well-known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 2(b) and 2(c) is depicted because if the RLC functions are implemented in and performed by the MAC layer, the RLC layer itself is not required. The packet data convergence protocol (PDCP) layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the E-UTRAN.

As illustrated in FIG. 2(b), the RLC and MAC layers (terminated in an eNodeB 103 on the network side) may perform functions such as scheduling, automatic repeat request (ARQ), and hybrid automatic repeat request (HARM). The PDCP layer (terminated in eNodeB 103 on the network side) may perform the user plane functions such as header compression, integrity protection, and ciphering.

As illustrated in FIG. 2(c), the RLC and MAC layers (terminated in an eNodeB 103 on the network side) perform the same functions as for the control plane. As illustrated, the RRC layer (terminated in an eNodeB 103 on the network side) may perform functions such as broadcasting, paging, RRC connection management, RB control, mobility functions, and UE measurement reporting and controlling. The NAS control protocol (terminated in the MME of gateway 105 on the network side) may perform functions such as an SAE bearer management, authentication, LTE_IDLE mobility handling, paging origination in LTE_IDLE, and security control for the signaling between the gateway and UE 101.

The NAS control protocol may use three different states; first, a LTE_DETACHED state if there is no RRC entity; second, a LTE_IDLE state if there is no RRC connection while storing minimal UE information; and third, an LTE_ACTIVE state if the RRC connection is established. Also, the RRC state may be divided into two different states such as a RRC IDLE and a RRC CONNECTED.

In RRC_IDLE state, the UE 101 may receive broadcasts of system information and paging information while the UE 101 specifies a discontinuous reception (DRX) configured by NAS, and the UE has been allocated an identification (ID) which uniquely identifies the UE in a tracking area. Also, in RRC-IDLE state, no RRC context is stored in the eNodeB 103.

In RRC_CONNECTED state, the UE 101 has an E-UTRAN RRC connection and a context in the E-UTRAN, such that transmitting and/or receiving data to/from the network (eNodeB) becomes possible. Also, the UE 101 can report channel quality information and feedback information to the eNodeB 103.

In RRC_CONNECTED state, the E-UTRAN knows the cell to which the UE 101 belongs. Therefore, the network can transmit and/or receive data to/from the UE 101, the network can control mobility (handover) of the UE 101, and the network can perform cell measurements for a neighbouring cell.

In RRC_IDLE mode, the UE 101 specifies the paging discontinuous reception (DRX) cycle. Specifically, the UE 101 monitors a paging signal at a specific paging occasion of every UE specific paging DRX cycle.

The procedure where a UE sends a first message to a network is commonly referred to as initial access. In most systems the initial access is initiated by a UE transmitting a connection request message including the reason of the request, and receiving an answer from the network indicating the allocation of radio resources for the requested reason.

In 3GPP TS 25.331 there are several reasons, referred to as establishment causes, for sending a connection request message. Establishment causes include:

originating conversational/streaming/interactive/background/subscribed traffic call, terminating conversational/streaming/interactive/background call, emergency call, inter radio access technology (RAT) cell re-selection, inter-RAT cell change order, registration, detach, originating high/low priority signaling, call re-establishment and terminating high/low priority signaling.

An "originating call" establishment indicates that the UE 101 wishes to setup a connection, for instance a speech connection. A "terminating call" establishment indicates that the UE 101 answers to paging. A "registration" establishment indicates that the user wants to register only to the network.

To initiate access to the network a random access procedure is used. The physical random access transmission is under the control of higher layer protocol which performs some important functions related to priority and load control. These procedures differ in detail but GSM, UMTS and LTE radio systems have some similarities between them.

In the random access procedure the UE 101 randomly selects an access resource and transmits a RACH preamble to the network. A preamble is a short signal that is sent before the transmission of the RACH connection request message. The UE 101 can repeatedly transmit the preamble by increasing the transmission power each time the preamble is sent until the network indicates the detection of the preamble. The message part can then be sent at the level of power equal of the last preamble transmission power plus an offset signaled by the network.

A random access channel (RACH) is a common physical channel dedicated to the random access procedure. Uplink transmissions are generally initiated through a RACH. A UE sending data on a RACH has not yet been identified by the target eNB. RACH is typically an uplink common channel used for transmitting control information and user data. It is applied in random access, and used for low-rate data transmissions from the higher layer. Such a channel is said to be contention-based since many users can attempt to access the same base station simultaneously, leading to collisions. A RACH channel can be used for several purposes. For example the RACH can be used to access the network, to request resources, to carry control information, to adjust the time offset of the uplink in order to obtain uplink synchronisation, to adjust the transmitted power, etc.

A random access procedure can be launched by the UE or the eNodeB. It may, for instance, be triggered by the following events:
- a UE switches from power-off to power-on and needs to be registered to the network.
- a UE is not time-synchronized with a eNodeB and starts transmitting data (for instance the user calls).
- a eNodeB starts transmitting data to the UE but they are not synchronized (for instance the user receives a call).
- a eNodeB measures a delay of the received signal from the UE (for instance the user is moving and has lost synchronization).
- a UE is moving from one cell to another and needs to be time-synchronized with a different target eNodeB than the serving eNodeB it is registered to (handover).

In LTE, the basic unit of time is a slot (generally of a duration of 0.5 ms). Two slots make up a subframe and ten subframes constitute a radio frame. A random access channel typically occupies 6 resource blocks in a subframe or set of consecutive subframes reserved for random access preamble transmissions. A RACH period can be configured to be, for example, 1 ms, 2 ms, 5 ms and 10 ms. FIG. 3 shows one possible mapping of the RACH within a resource grid.

FIG. 4 illustrates an example of the sequences of messages and responses exchanged between a user equipment UE 101 and a base station eNB 103 in a typical RACH procedure.

Firstly the UE 101 retrieves information transmitted periodically from eNB 103 on a downlink broadcast channel (BCH). The received information includes the available preamble signatures in the cell, the location and period of RACH time slots; From the received information the UE 101 selects a preamble signature, a RACH time slot and a frequency band. The preamble signature is chosen by the UE 101 from among a set of preamble signatures known by the eNB 103. The UE 101 generates a single random access burst containing the chosen preamble signature and transmits it to the eNB 103 over the selected time slot at the selected frequency in message 1.

The random access burst consists of a cyclic prefix, a preamble, and a guard time during which nothing is transmitted as illustrated in FIG. 5. CP denotes cyclic prefix, GT denotes guard time, RTD denotes round trip delay and TTI denotes transmission time interval.

The preamble is sent before a RACH connection request and indicates that the UE is about to transmit data. The random access burst is transmitted during one subframe. While the UE is not synchronized in the time domain, its random access burst may overlap with the next subframe and generate interference. A guard time may thus be added to combat interference. The guard time (GT) should be at least equal to the round-trip delay at the cell edge.

During the random access procedure, several users share the same channel. They are distinguishable by virtue of orthogonal sequences. These sequences are seen as the UE preamble signatures that can be transmitted simultaneously. A collision occurs whenever several users choose the same signature and send it within the same time and frequency resources.

The eNB 103 monitors the current RACH slot in an attempt to detect preambles transmitted from UEs in the corresponding cell.

On reception of a signal the eNB 103 correlates the received signal in the RACH sub-frame with all possible signatures. Detection of the preamble can be either performed in the time domain or in the frequency domain. A detection variable is computed for each signature. If the detection variable exceeds a certain threshold, the preamble is considered detected.

The eNB 103 sends a random access response to acknowledge the successfully detected preambles in message 2. This message is sent on a dedicated downlink channel and uses the detected signature. It contains a timing advance command, a power-control command. If the procedure is contention-free then the UE and the eNodeB are thereby aligned in the time domain.

If the UE 101 receives a response from the eNB 103 the UE 101 decodes the response and adapts its transmission timing, and its transmission power if the response contains power control information. The UE 101 then sends a resource request message—message 3—on a dedicated uplink channel. In this message, the UE requests bandwidth and time resources to transmit data and it also indicates a UE-specific identifier. If the UE requests resources, the UE 101 uses a specific ID in the message to resolve contentions. Then the UE monitors a specified downlink channel for response from the eNB. In the case of a positive resource grant, the subsequent transmissions are carried out as normal.

The eNB attempts to resolve any contentions. If the eNB 103 receives a resource request with a UE-specific signature the eNB 103 checks how many UEs were detected with the same signature and resolves any possible contentions. If the preamble sent by UE 101 was in collision with a preamble from another UE, the eNB 103 sends a contention resolution message—message 4—to give the command to UE 101 to restart the RACH procedure. If on the other hand the UE 101 was not in collision, the eNB sends a resource assignment message—message 5. In this case the subsequent transmissions are carried out as usual. The eNB 103 identifies the UE 101 and assigns resources according to the scheduling rules applied.

In the random access response, message 2, the UE may receive an ACK signal from the eNB to indicate that a message can be sent, a NACK signal indicating that the preamble was detected but a message cannot to be sent, or no response indicating that the preamble was not detected.

In the case where UE 101 receives no response indicating that a preamble has not been detected at the first attempt the UE 101 waits for the next RACH slot to send another preamble. The preamble signal-to-noise ratio (SNR) is relatively low compared to data SNR owing to the length of the zero-correlation sequences. Given that the random access channel does not generate much interference, the UE can afford to increase the transmission power by a few decibels (dB) at the second attempt to prevent consecutive failures (power ramping method). A too long delay is not desirable, especially in the case of handovers. The UE 101 repeatedly transmits the preamble by increasing the transmission power every time the preamble is sent until the network indicates the detection of the preamble. The procedure is exited after a certain number of failures. If a preamble is successfully transmitted the message part is generally sent at the level of power equal to the last preamble transmission power plus an offset signaled by the network.

In LTE (Long Term Evolution) only a limited number of resource block aggregations on a carrier is supported. If the number of resource blocks available for an operator's use is larger than the closest specified aggregation, those resource blocks are wasted. Moreover, each stand-alone carrier introduces some overhead (in terms of guard bands, system information, synchronization, etc.) This overhead can be reduced by introduction of the extension of a carrier commonly referred to as segments as the part of the carrier aggregation in LTE-A, rather than defining a stand-alone carrier. An extension carrier can enable aggregation of an arbitrary number of resource blocks associated with a component carrier, while still retaining the backward compatibility of that carrier. For example, consider a frequency allocation of 70 RBs, where those RBs would be aggregated as a backwards compatible carrier of 50 RBs and 20 additional RBs only visible to LTE-A UEs. forming the extended carrier (segment).

A proposed structure of the extended carrier (segment) is illustrated in FIG. 5. The carrier bandwidth is B MHz, where the central B0 MHz is defined in the existing system information, and LTE UEs would be aware of this bandwidth part only. The extended carrier bandwidth of B MHz would be conveyed to the LTE-A UEs only. Therefore, the LTE UEs would be aware of B0 MHz while LTE-A UEs would be aware of the extended B MHz. Within the central B0 MHz all control and data structure conform to the LTE specifications. The side segments form a group of resource blocks that are seen as a bandwidth extension for LTE-A UEs.

If a eNodeB of a network is not aware of whether a UE accessing the network is a LTE compatible UE or a LTE-A compatible UE there may be a mismatch between the resources allocated to the UE and the capabilities of the UE. For example a LTE compatible UE may be allocated resources which it cannot use leading to a waste of uplink resources or a LTE-A compatible may be given access to restricted resources and not be able to avail of the extra radio resources it is capable of using.

DISCLOSURE OF INVENTION

Solution to Problem

According to a first aspect of the present invention there is provided a method of allocating radio resources to a UE according to the capability of the UE, wherein the radio resources to be allocated include a set of radio resources which are incompatible with a first type of UE and are compatible with at least a second type of UE, the method comprising: receiving a random access preamble from a UE; transmitting a first random access response assigning a first set of radio resources compatible with the first type of UE, and a second random access response assigning a second set of radio resources incompatible with the first type of UE; wherein the first random access response is scheduled differently in time and/or frequency to the second access response; receiving a connection request message from the UE; wherein, if the connection request message is received on the first set of radio resources it is determined that the UE is a UE of the first type; and wherein if the connection request message is received on the second set of radio resources, it is determined that the UE is not of the first type.

In some embodiments of the invention the first random access response and the second random access response may be transmitted using the first set of radio resources; or alternatively the first random access response may be transmitted using the first set of radio resources and the second random access response may be transmitted using the second set of radio resources.

A second aspect of the invention provides a method of indicating UE capability in a radio system wherein the radio resources to be allocated to an UE include a set of radio resources incompatible with a first type of UE and compatible with at least a second type of UE, the method comprising: transmitting a random access preamble; receiving a first random access response assigning a first set of radio resources compatible with the first type of UE in the case where the UE is of the first type of UE and a second random access response assigning a second set of radio resources incompatible with the first type of UE in the case where the UE is not of the first type of UE; wherein the first random access response is scheduled differently in time and/or frequency to the second access response; transmitting a connection request message on the first set of radio resources in the case where the UE is a UE of the first type; otherwise transmitting the connection request message on the second set of radio resources, if the UE is not of the first type.

In some embodiments of the invention, the first random access response and the second random access response may be received using the first set of radio resources, or alternatively the first random access response may be received using the first set of radio resources and the second random access response may be received using the second set of radio resources.

A third aspect of the invention provides a method of allocating radio resources to a UE according to the capability of the UE wherein the radio resources to be allocated include resources incompatible with a first type of UE, the method comprising: receiving a random access preamble from the UE, determining the radio resources on which the random access preamble was transmitted; wherein if it is determined that the radio resources belong to a first set of radio resources compatible with the first type of UE it is determined that the UE is of the first type of UE, whereas if it is determined that the radio resources belong to a second set of radio resources incompatible with the first type of UE it is determined that the UE is not of the first type of UE.

A fourth aspect of the invention provides a method of indicating UE capability in a radio system wherein the radio resources to be allocated to an UE include resources incompatible with a first type of UE, the method comprising: receiving random access resource information; selecting random access resources for transmission of a random access preamble based on the capability of the UE; transmitting a random access preamble using the selected random access resources; wherein if the UE is of a first type of UE the UE selects a first set of random access resources compatible with the first type of UE and wherein if the UE is of a second type of UE the UE selects a second set of random access resources incompatible with the first type of UE.

In some embodiments of the invention, the first set of radio resources may be located on a different component carrier than the second set of radio resources. Alternatively the first set of radio resources may be located on the same component carrier as the second set of radio resources.

In some embodiments of the invention the radio resources to be allocated may extend over a bandwidth B having a portion of bandwidth $B_0$, where $B_0 < B$, and two extending segments on either side of the portion of bandwidth $B_0$, the portion of bandwidth $B_0$ corresponding to the first set of radio resources, and the two extending segments corresponding to the second set of radio resources.

The first type of UE may be LTE compatible and the second type of UE may be LTE-A compatible.

In some embodiments of the invention, the second set of radio resources may be a function of the first set of radio resources.

A fifth aspect of the invention provides a network entity for allocating radio resources to a UE according to the capability of the UE wherein the radio resources to be allocated include resources incompatible with a first type of UE, the network entity comprising: a transceiver for detecting a random access preamble from a UE, transmitting a first random access response assigning a first set of radio resources compatible with the first type of UE and a second random access response assigning a second set of radio resources incompatible with the first type of UE; wherein the first random access response is scheduled differently in time and/or frequency to the second access response; receiving a connection request message from the UE; and a processor for determining that the UE is a UE of the first type when the connection request message is received on the first set of radio resources and that the UE is not of the first type when the connection request message is received on the second set of radio resources.

A sixth aspect of the invention provides a user entity in a radio system wherein the radio resources to be allocated at an UE include at least one set of resources incompatible with a first type of UE, the UE comprising: a transceiver for transmitting a random access preamble to a eNodeB, receiving a first random access response assigning a first set of radio resources compatible with the first type of UE in the case where the UE is of the first type of UE and a second random access response assigning a second set of radio resources incompatible with the first type of UE in the case where the UE is not of the first type of UE; wherein the first random access response is scheduled differently in time and/or frequency to the second access response; transmitting a connection request message on the first set of radio resources in the case where the UE is a UE of the first type; otherwise transmitting the connection request message on the second set of radio resources, if the UE is not of the first type.

A seventh aspect of the invention provides a network entity for allocating radio resources to a UE according to the capability of the UE wherein the radio resources to be allocated include resources incompatible with a first type of UE, the network entity comprising: a transceiver for receiving a random access preamble from the UE; a processor for determining the radio resources on which the random access preamble was transmitted; wherein if it is determined that the radio resources belong to radio resources incompatible with the first type of UE it is determined that the UE is not of the first type of UE.

An eighth aspect of the invention provides a user entity in a radio system wherein the radio resources to be allocated at an UE include at least one set of resources incompatible with a first type of UE, the UE comprising: a transceiver for receiving random access resource information; a processor for selecting random access resources for transmission of a random access preamble based on the capability of the UE; wherein the transceiver is operable to transmit a random access preamble using the selected random access resources; and the processor is operable to select random access resources compatible with the first type of UE if the UE is of a first type of UE, and to select random access resources incompatible with the first type of UE if the UE is not of a first type of UE.

At least parts of the methods according to the invention may be computer implemented. The methods may be implemented in software on a programmable apparatus. They may also be implemented solely in hardware or in software, or in a combination thereof.

Since parts of the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF DRAWINGS

Embodiments of the invention will now be described, by way of example only, and with reference to the following drawings in which.

MODE FOR THE INVENTION

Reference will now be made in detail to embodiments of the present invention, examples of which are illustrated in the accompanying drawings.

Figure 6:
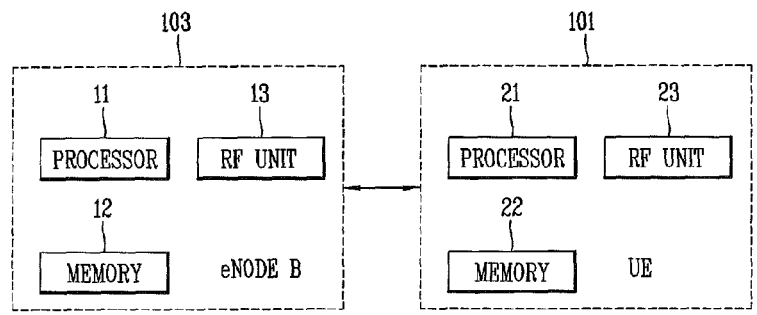
FIG. 6 is a block diagram illustrating some components of a UE and eNodeB which may be used in the context of embodiments of the invention.
Figure 7:
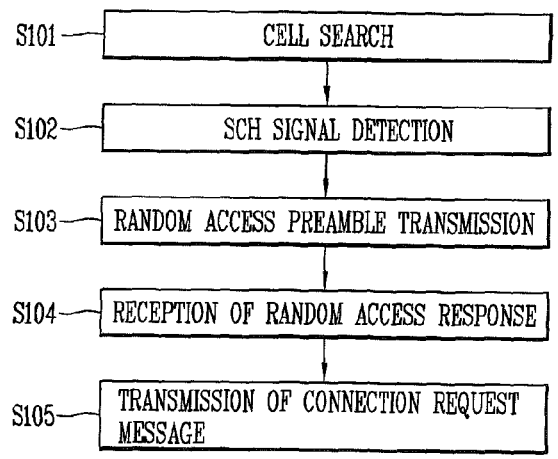
FIG. 7 is a flow chart of steps of a method of indicating UE capability according to an embodiment of the invention.

FIG. 6 illustrates a wireless communication system including an eNodeB base station 103 and one or more UEs 101. The eNodeB 103 includes a processor 11, a memory 12, and a radio frequency (RF) unit 13 for transmission and reception. The processor 11 is operable to implement proposed procedures and/or methods according to embodiments of the invention. The memory 12 is coupled to the processor 11 and stores a variety of information for the operation of the processor 11. The RF unit 13 is coupled with the processor 11 and transmits and/or receives a radio signal. The UE 101 includes a processor 21, a memory 22, and a RF unit 23. The processor 21 may be configured to implement proposed procedures and/or methods according to embodiments of the invention. The memory 22 is coupled with the processor 21 and stores a variety of information for operating the processor 21. The RF unit 23 is coupled with the processor 21 and transmits and/or receives a radio signal. The BS 10 and/or the UE 20 may have single antenna and multiple antennas. When at least one of the BS 10 and the UE 20 has multiple antennas, the wireless communication system may be referred to as multiple input multiple output (MIMO). system. The UE 101 may be LTE compatible or LTE-A compatible type UE FIG. 7 illustrates a communication procedure between a user equipment UE 101 and an eNodeB 103 according to a first embodiment of the present invention.

In step S101 the UE 101 irrespective of type (LTE or LTE-A) performs a cell search on a downlink LTE compatible carrier. In this way backward compatibility is maintained for all UE types.

Figure 1:
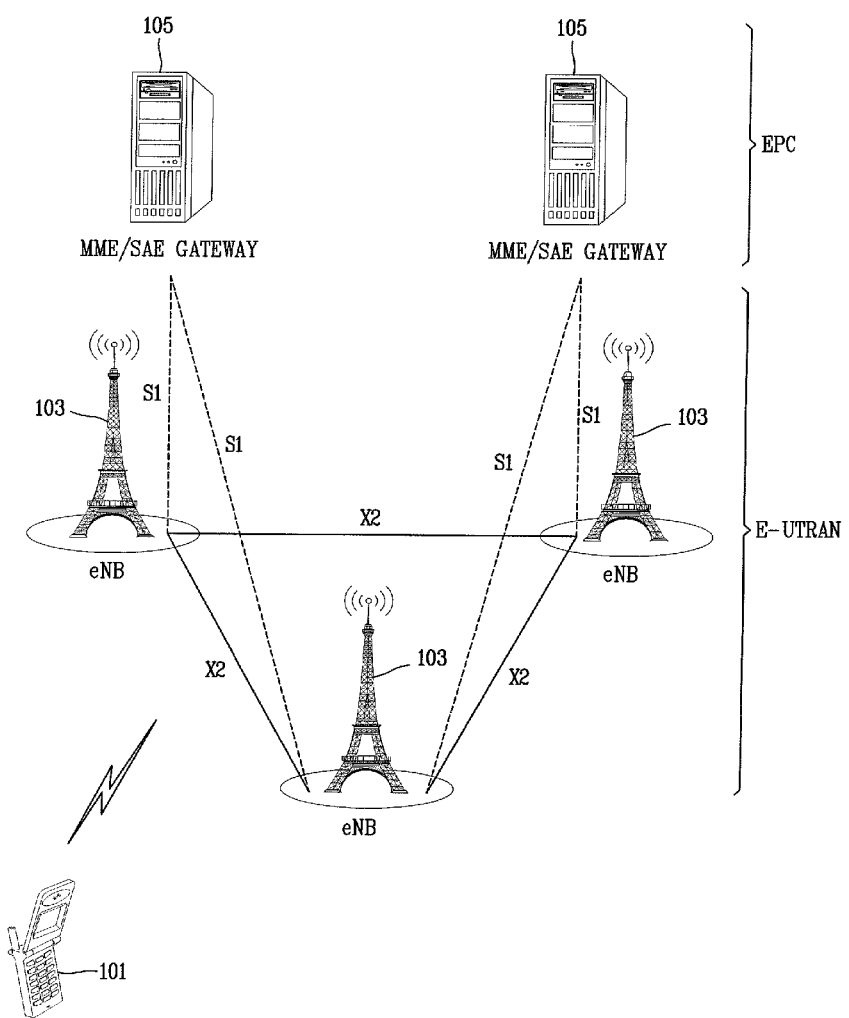
FIG. 1 is a block diagram illustrating network structure of an E-UTRA system.
Figure 2A:
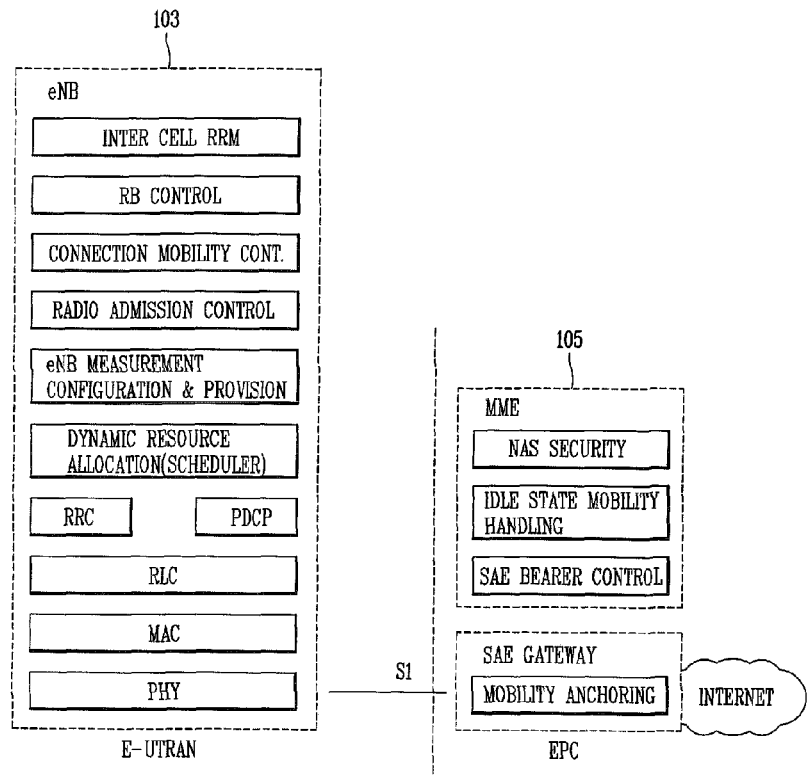
FIGS. 2(a), 2(b) and 2(c) are block diagrams depicting logic architecture of typical network entities of the LTE system (FIG. 2(a)), a user-plane (U-plane) protocol stack (FIG. 2(b)) and a control-plane (C-plane) protocol stack (FIG. 2(c)).
Figure 2B:
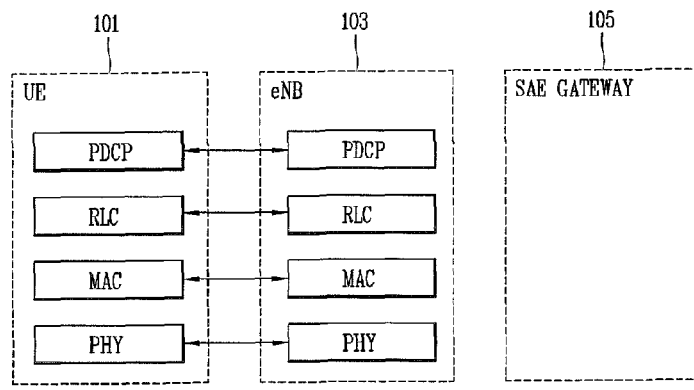
Figure 2C:
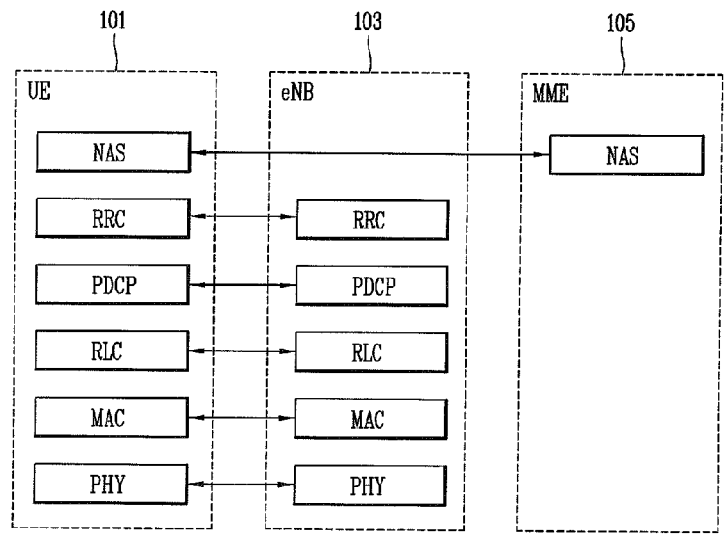
Figure 3:
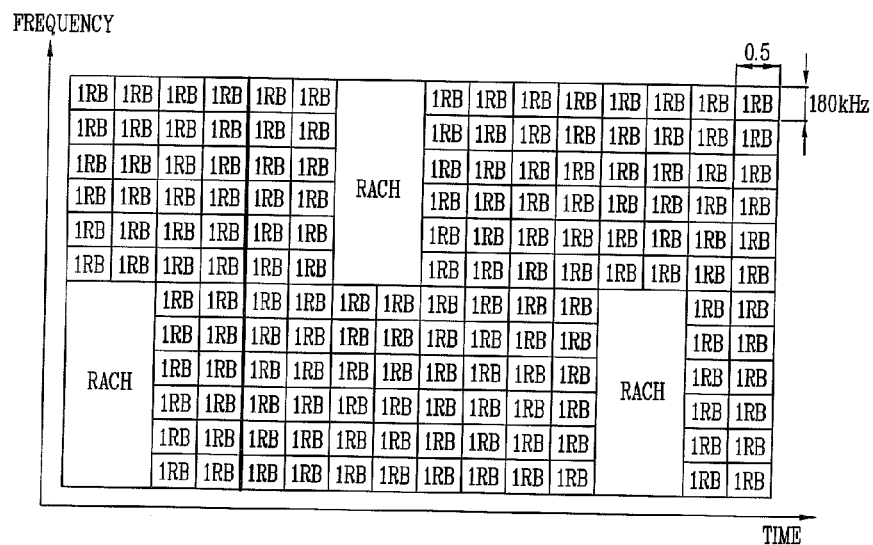
FIG. 3 graphically illustrates an example of the location of RACH slots in a 2.5 MHz bandwidth.
Figure 4:
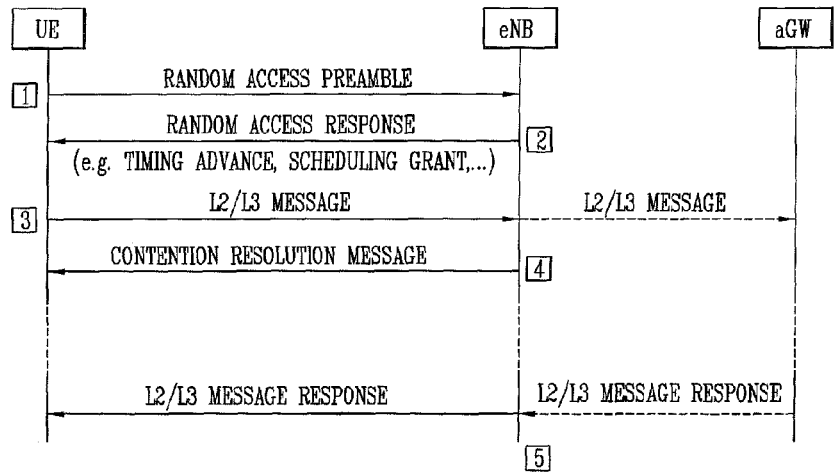
FIG. 4 is a diagram illustrating steps of a typical RACH procedure.
Figure 5:
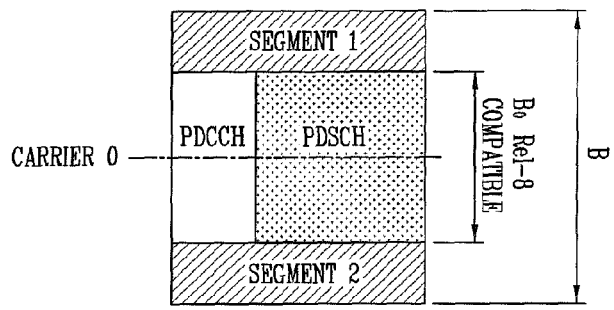
FIG. 5 schematically illustrates a down link carrier having two segments of LTE-A compatible resources.

In step S102 the UE detects a SCH signal on the LTE compatible carrier information containing an indication on several physical channel configurations. At this stage the UE may also be informed on the presence of DL/UL segments of FIG. 5. It can be noted that this information would be only used if the UE is an LTE-A type UE which has enhanced functionalities to communicate on the extended carriers. (LTE type UEs do not have such capabilities).

The system Information also provides configuration of the random access channel to be used on an UL component carrier (UL carrier 0). In order to maintain backward compatibility with LTE type UEs the eNodeB may configure random access channel on an UL LTE type compatible carrier. In particular embodiments it might also configure a random access channel on UL segment(s). If the random access channel is configured on one or more segments then the UE can only access a segment if it is a LTE-A type. Alternatively the random access can be initiated by a PDCCH order or by the MAC sublayer itself In step S103 the UE 101 selects random access resources and transmits a random access preamble to the eNodeB 103. After the random access preamble has been transmitted the UE 101 monitors the PDCCG for a Random Access Response identified by the Random Access Radio network Temporary ID (RA-RNTI).

In response to reception of the random access preamble the eNodeB 103 transmits a first random access response assigning a first set of LTE compatible radio resources and a second random access response assigning a second set of radio resources which are LTE-A compatible radio resources and not compatible with LTE type UEs. Such resources may be located in the segments illustrated in FIG. 5. The first random access response may be scheduled differently in time to the second random access response. In some embodiments of the invention, the first random access response may be scheduled differently in frequency of the second random access response. The random access response is received by the UE 101 in step S104.

In a first embodiment of the invention both the first random access response and the second random access response are transmitted using the first set of radio resources which are compatible with both LTE type and LTE-A type UEs.

Figure 8:
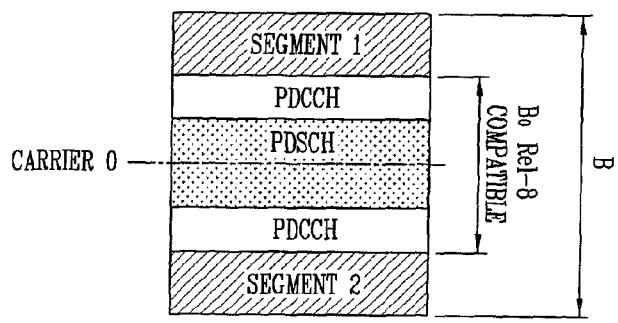
FIG. 8 schematically illustrates an up link carrier having two segments of LTE-A compatible resources.

In the first embodiment of the invention the first set of radio resources and the second set of radio resources are located on the same component carrier. As illustrated in FIG. 8, the radio resources to be allocated extend over a bandwidth B having a portion of bandwidth B0, where B0<B, and two extending segments on either side of the portion of bandwidth B0, segment 1 and segment 2. The portion of bandwidth B0 corresponds to the first set of radio resources compatible with both LTE and LTE-A type UEs, and the two extending segments, segment 1 and segment 2, correspond to the second set of radio resources which are incompatible with LTE type UEs but compatible with LTE-A type UEs. The radio resources compatible with an LTE-A type UE also includes the bandwidth portion B0. Thus the radio resources compatible with an LTE-A type UE extend over the total bandwidth B.

Figure 9:
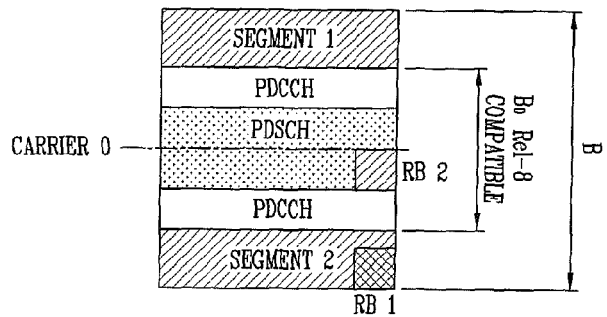
FIG. 9 schematically illustrates an up link carrier having two segments of LTE-A compatible resources in which resources in the LTE-A compatible segments are mapped to resources in the LTE compatible portion.

The second set of LTE-A compatible radio resources may be a function of the first set of radio resources. With reference to FIG. 9 the location of a resource block RB2 in the second set of radio resources may be determined from a corresponding resource block RB1 in the first set of radio resources. For example there may be a mapping relationship between the first set of LTE compatible resources assigned by the first random access response and the second set of LTE-A compatible resources assigned by the second random access response. In some embodiments the second set of LTE-A resources may be determined from the first set of LTE-A resources by means of a formula.

In an alternative embodiment of the invention the first set of radio resources may be located on a different component carrier than the second set of radio resources.

In the case where the UE 101 is a LTE type UE, the UE 101 will only be capable of using the LTE compatible radio resources assigned in the first random access response, whereas in the case where the UE 101 is a LTE-A type UE, the UE 101 will be capable of using the LTE-A compatible radio resources assigned in the second random access response.

In step S105 the UE 101 transmits a connection request message to the eNodeB 103 using the assigned radio resources. If the UE 101 is a LTE type UE the UE 101 will use the LTE compatible radio resources assigned in the first random access response to transmit the connection request message, whereas in the case where the UE 101 is a LTE-A type UE, the UE 101 will use the LTE-A compatible radio resources assigned in the second random access response to transmit the connection request message.

The eNodeB 103 receives the connection request message. If the connection request message is received on the first set of radio resources compatible with LTE type UEs the eNodeB 103 determines that the UE 101 is an LTE type UE, whereas if the connection request message is received on the second set of radio resources the eNodeB 103 determines that the UE 101 is an LTE-A type UE with enhanced functionalities and capable of using extra radio resources incompatible with LTE type UEs. The eNodeB 103 can then allocate resources to the UE 101 according to the capability of the UE 101.

In a further embodiment of the invention, the first random access response for assigning the LTE compatible radio resources is transmitted by the eNodeB using the first set of radio resources which are compatible with both LTE type and LTE-A type UEs, and the second random access response for assigning LTE-A type compatible radio resources is transmitted using the second set of radio resources which are incompatible with the LTE type UEs but which are compatible with a LTE-A type UE.

In this further embodiment, if the UE 101 is a LTE type UE then the UE 101 will only be capable of detecting the first random access response allocating the LTE compatible resources. If the UE 101 is an LTE-A type UE then the UE 101 will be capable of detecting the second random access response allocating the radio resources which may be used by an LTE-A type UE. As in the previous embodiment the eNodeB can determine whether the UE is a LTE type UE by the radio resources sued to send a connection request.

Figure 10:
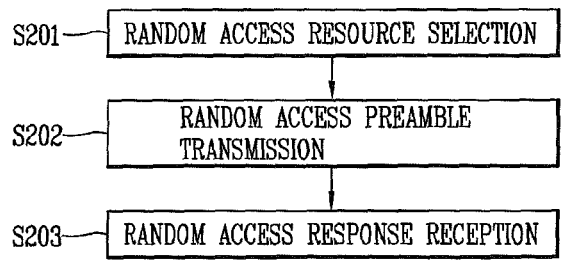
FIG. 10 is a flow chart of steps of a method of indicating UE capability according to a further embodiment of the invention.

In an even further embodiment of the invention RACH may be configured on the LTE-A compatible radio resource segments which are incompatible with LTE type UEs. With reference to FIG. 10, in this embodiment in step 201 the UE 101 receives random access resource information and selects random access resources for transmission of a random access preamble to the eNodeB 103 based on the capability of the UE 101. If the UE 101 is a LTE type UE the random access preamble is transmitted from the UE 101 to the eNodeB 103 in step S202 on the random access resources compatible with a LTE type UE 101. If on the other hand the UE 101 is an LTE-A type UE, then the random access preamble is transmitted from the UE 101 to the eNodeB 103 using a different set of random access resources which are compatible with LTE-A type UEs, but incompatible with LTE type UEs.

In step S203 the eNodeB 103 which receives the random access preamble determines the random access resources on which the random access preamble was transmitted. If the eNodeB 103 determines that the random access resources on which the random access preamble was transmitted corresponds to random access resources compatible with an LTE type UE then the enodeB 103 determines that the UE 101 is an LTE type UE and assigns radio resources to the UE 101 which are compatible with an LTE type UE. The eNodeB 103 then sends a random access response to the UE 101 assigning the LTE compatible radio resources. If on the other hand the eNodeB 103 determines that the random access resources correspond to random access resources which are incompatible with an LTE type UE but compatible with a LTE-A type UE then the eNodeB 103 determines that the UE 101 is an LTE-A type UE and assigns LTE-A compatible resources to the UE 101. The eNodeB 103 then sends a random access response to the UE 101 assigning the LTE-A compatible radio resources.

Many further modifications and variations will suggest themselves to those versed in the art upon making reference to the foregoing illustrative embodiments, which are given by way of example only and which are not intended to limit the scope of the invention, that being determined solely by the appended claims.

The invention claimed is:

1. A method of allocating radio resources to a terminal according to a capability of the terminal, wherein the radio resources to be allocated include a set of radio resources which are incompatible with a first type of terminal and are compatible with at least a second type of terminal, the method performed by a base station comprising:
receiving, at a base station, a random access preamble from the terminal;
transmitting a first random access response assigning a first set of radio resources compatible with the first type of terminal, and a second random access response assigning a second set of radio resources incompatible with the first type of terminal,
wherein the first random access response is scheduled differently at least in time or frequency to the second random access response;
receiving a connection request message from the terminal,
wherein, if the connection request message is received on the first set of radio resources, the terminal is the first type of terminal;
wherein if the connection request message is received on the second set of radio resources, the terminal is the second type of terminal,
wherein the first set of radio resources are located on a same component carrier as the second set of radio resources, and
wherein the radio resources to be allocated extend over a bandwidth B having a portion of bandwidth B0, where B0<B, and two extending segments on either side of the portion of bandwidth B0, the portion of bandwidth B0 corresponding to the first set of radio resources, and the two extending segments corresponding to the second set of radio resources.

2. A method according to claim 1, wherein the first random access response and the second random access response are transmitted using the first set of radio resources; or the first random access response is transmitted using the first set of radio resources and the second random access response is transmitted using the second set of radio resources.

3. A method of indicating a capability of a terminal in a radio system wherein radio resources to be allocated to the terminal include a set of radio resources incompatible with a first type of terminal and compatible with at least a second type of terminal, the method performed by the terminal, comprising:
transmitting, by the terminal, a random access preamble;
receiving a first random access response assigning a first set of radio resources compatible with the first type of terminal if the terminal is the first type of terminal, and a second random access response assigning a second set of radio resources incompatible with the first type of terminal if the terminal is the second type of terminal,
wherein the first random access response is scheduled differently at least in time or frequency to the second random access response;
transmitting a connection request message on the first set of radio resources if the terminal is the first type of terminal; and
transmitting the connection request message on the second set of radio resources if the terminal is the second type of terminal,
wherein the first set of radio resources are located on a same component carrier as the second set of radio resources, and
wherein the radio resources to be allocated extend over a bandwidth B having a portion of bandwidth B0, where B0<B, and two extending segments on either side of the portion of bandwidth B0, the portion of bandwidth B0 corresponding to the first set of radio resources, and the two extending segments corresponding to the second set of radio resources.

4. A method according to claim 3, wherein the first random access response and the second random access response are received using the first set of radio resources; or the first random access response is received using the first set of radio resources and the second random access response is received using the second set of radio resources.

5. The method according to claim 1, wherein the first set of radio resources is located on a different component carrier than the second set of radio resources.

6. The method according to claim 1, wherein the first type is Long Term Evolution compatible and the second type of terminal is Long Term Evolution Advanced compatible.

7. The method according to claim 1, wherein the second set of radio resources is a function of the first set of radio resources.

8. A base station for allocating radio resources to a terminal according to a capability of the terminal wherein the radio resources to be allocated include resources incompatible with a first type of terminal, the base station comprising:
a transceiver configured to:
receive a random access preamble from the terminal;
transmit a first random access response assigning a first set of radio resources compatible with the first type of terminal, and a second random access response assigning a second set of radio resources incompatible with the first type of terminal,
wherein the first random access response is scheduled differently at least in time or frequency to the second random access response; and
receive a connection request message from the terminal;
and a processor configured to:
determine that the terminal is the first type of terminal if the connection request message is received on the first set of radio resources, and that the terminal is a second type of terminal if the connection request message is received on the second set of radio resources,
wherein the first set of radio resources are located on a same component carrier as the second set of radio resources, and
wherein the radio resources to be allocated extend over a bandwidth B having a portion of bandwidth B0, where B0<B, and two extending segments on either side of the portion of bandwidth B0, the portion of bandwidth B0 corresponding to the first set of radio resources, and the two extending segments corresponding to the second set of radio resources.

9. A terminal in a radio system, wherein radio resources to be allocated to the terminal include at least one set of resources incompatible with a first type of terminal of the terminal, the terminal comprising:
a transceiver configured to:
transmit a random access preamble to a base station,
receive a first random access response assigning a first set of radio resources compatible with the first type of terminal if the terminal is the first type of terminal and a second random access response assigning a second set of radio resources incompatible with the first type of terminal if the terminal is not the first type of terminal;
wherein the first random access response is scheduled differently at least in time or frequency to the second random access response;

transmit a connection request message on the first set of radio resources if the terminal is the first type of terminal; and transmit the connection request message on the second set of radio resources, if the terminal is not the first type of terminal, wherein the first set of radio resources are located on a same component carrier as the second set of radio resources, and wherein the radio resources to be allocated extend over a bandwidth B having a portion of bandwidth B0, where B0<B, and two extending segments on either side of the portion of bandwidth B0, the portion of bandwidth B0 corresponding to the first set of radio resources, and the two extending segments corresponding to the second set of radio resources.

10. The method according to claim 3, wherein the first set of radio resources is located on a different component carrier than the second set of radio resources.

11. The method according to claim 3, wherein the first type is Long Term Evolution compatible and the second type of terminal is Long Term Evolution Advanced compatible.

12. The method according to claim 3, wherein the second set of radio resources is a function of the first set of radio resources.

13. The base station according to claim 8, wherein the first random access response and the second random access response are transmitted using the first set of radio resources; or the first random access response is transmitted using the first set of radio resources and the second random access response is transmitted using the second set of radio resources.

14. The base station according to claim 8, wherein the first set of radio resources is located on a different component carrier than the second set of radio resources.

15. The base station according to claim 8, wherein the first type is Long Term Evolution compatible and the second type of terminal is Long Term Evolution Advanced compatible.

16. The base station according to claim 8, wherein the second set of radio resources is a function of the first set of radio resources.

17. The terminal according to claim 9, wherein the first random access response and the second random access response are received using the first set of radio resources; or the first random access response is received using the first set of radio resources and the second random access response is received using the second set of radio resources.

18. The terminal according to claim 9, wherein the first set of radio resources is located on a different component carrier than the second set of radio resources.

19. The terminal according to claim 9, wherein the first type is Long Term Evolution compatible and the second type of terminal is Long Term Evolution Advanced compatible.

20. The terminal according to claim 9, wherein the second set of radio resources is a function of the first set of radio resources.

* * * * *